(Model.) 2 Sheets—Sheet 1.
G. T. FALLIS.
WALKING TOY.
No. 376,588. Patented Jan. 17, 1888.
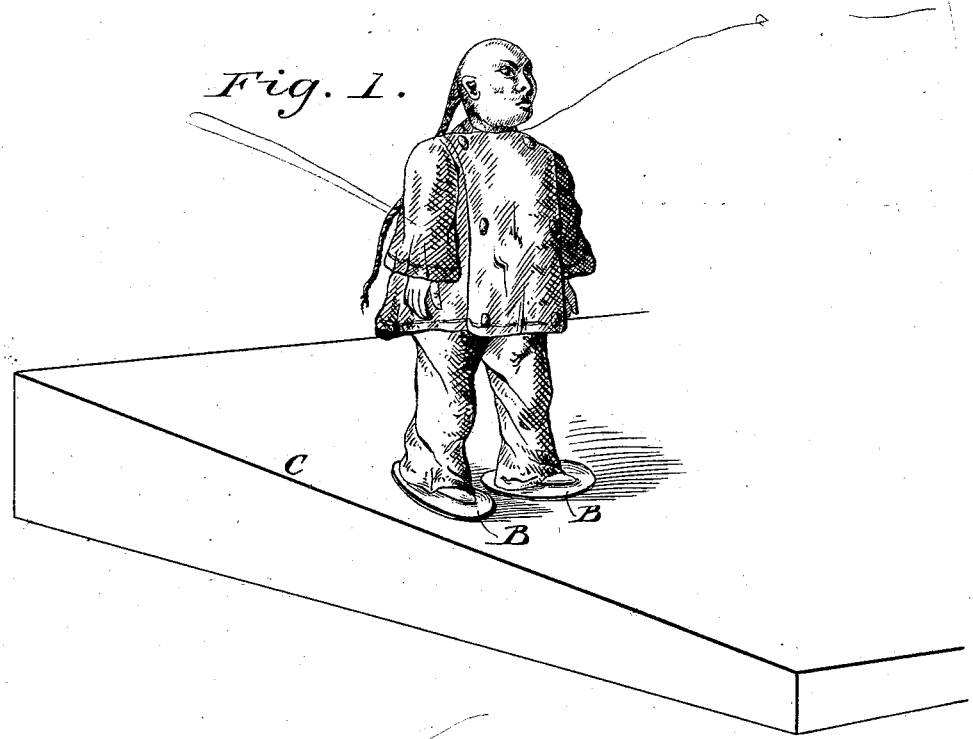
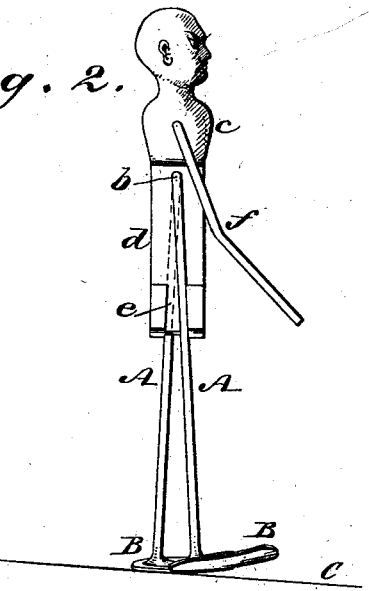
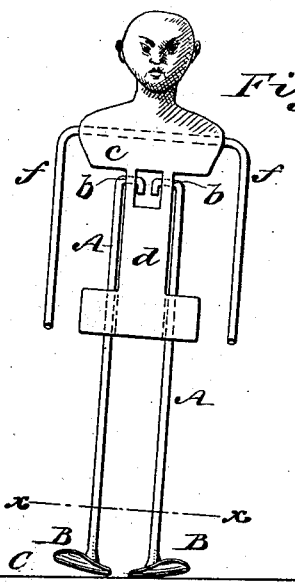
WITNESSES:
INVENTOR:
G. T. Fallis
BY Munn & Co
ATTORNEYS.

(Model.) 2 Sheets—Sheet 2.

G. T. FALLIS.
WALKING TOY.

No. 376,588. Patented Jan. 17, 1888.

WITNESSES:
John H. Beemer
C. Sedgwick

INVENTOR:
G. T. Fallis
BY Munn & Co.
ATTORNEYS.

UNITED STATES PATENT OFFICE.

GEORGE T. FALLIS, OF ST. JOSEPH, MISSOURI.

WALKING TOY.

SPECIFICATION forming part of Letters Patent No. 376,588, dated January 17, 1888.

Application filed April 16, 1887. Serial No. 235,059. (Model.)

*To all whom it may concern:*

Be it known that I, GEORGE T. FALLIS, of St. Joseph, in the county of Buchanan and State of Missouri, have invented a new and useful Improvement in Walking Toys, of which the following is a full, clear, and exact description.

This invention consists in a toy or figure which may be designed to simulate either the human frame or form or that of any or most of the lower order of animals or brute creation, and which is of a combined pendulum and rocker construction, whereby when placed upon an inclined plane it will be caused by the force of its own gravity to automatically step out and walk down said plane, or which may be led on a level or up an inclined surface and be similarly caused to walk with a like step over the same, substantially as hereinafter described.

Reference is to be had to the accompanying drawings, forming a part of this specification, in which similar letters of reference indicate corresponding parts in all the figures.

Figure 4:
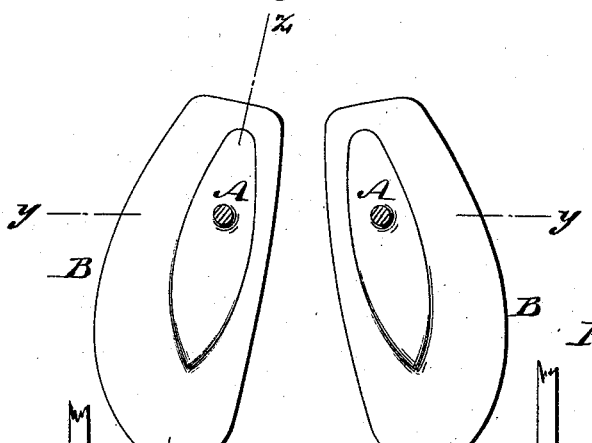
Figure 5:
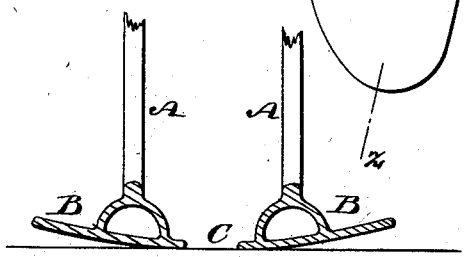
Figure 6:
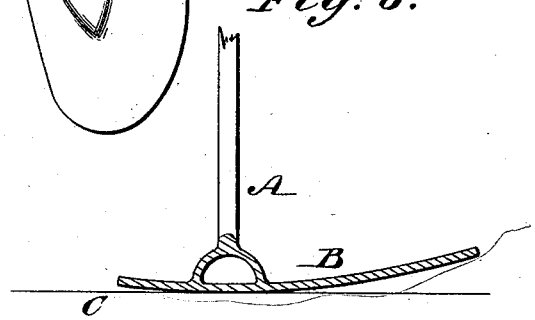
Figure 7:
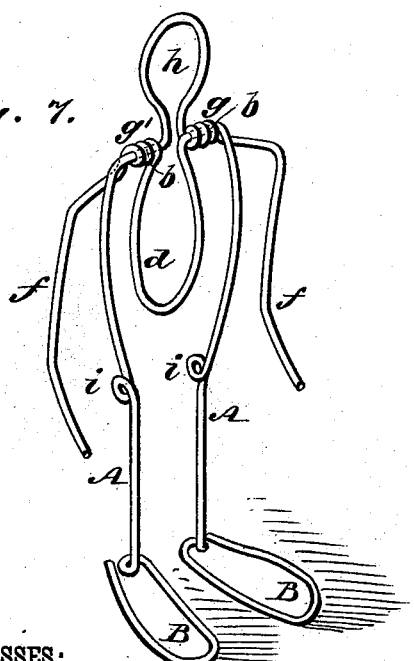
Figure 8:
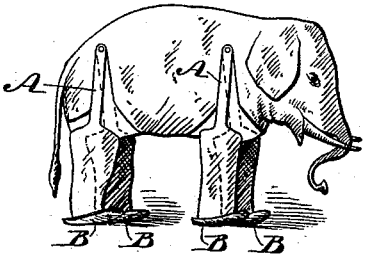

Figure 1 is a perspective view representing a human figure embodying my invention and as placed to walk down an inclined plane. Fig. 2 is a part skeleton view of a human figure as seen from its side, and as in the act of walking down an inclined plane or surface; and Fig. 3 is a front view of the same under like conditions. Fig. 4 is a horizontal section, upon a larger scale, on the line $x\ x$ in Fig. 3, mainly in illustration of the feet, which are in the form of rockers. Fig. 5 is a section, upon the line $y\ y$ in Fig. 4. Fig. 6 is a section, upon the line $z\ z$ in Fig. 4. Fig. 7 is a perspective view of a wire skeleton applicable to the human figure and embodying the invention; and Fig. 8 is a view of an elephant, or it might be any other quadruped, having the invention applied.

Referring in the first instance to the several figures from 1 to 7, inclusive, of the drawings, A A indicate the frame portion or parts, which simulate the legs of a human figure, both of which are of the same length, and which are pivoted above to rock from or round the same axial center, the pivots $b\ b$ and the portions of the frame or figure in which they work being organized and arranged in any suitable manner, as shown, for instance, in Figs. 3 and 7, or the "legs," as the parts A A will hereinafter be termed, being otherwise suitably hung to swing alternately as pendulum-rods in parallel planes, the feet B B representing the pendulum-balls or weights. This pendulum construction of the legs A A constitutes one of the necessary features of the invention.

Another necessary feature of the invention is the construction of the parts which represent or form the feet B B. These feet, which turn outward from the heel toward the toe, as in the case of the human foot, are of convex shape on their bottoms in a transverse direction, with their outer margins higher or at a shorter distance from the leg-pivots $b\ b$ than their inner margins, as shown in Figs. 3 and 5, thereby causing the two feet jointly to form a rocker, with the center of gravity of the figure falling between them in a line at a right angle to the common axis of the leg-pivots. The bottoms of the feet, also, are slightly curved upward from their middle in direction of their length, as shown in Figs. 2 and 6, and are nearly at right angles to the legs, so that when the figure is stood upon an inclined plane or surface, C, of suitable angle the pivot or pivots of the legs will drop a little forward of the center of gravity of the figure.

The figure or toy as thus constructed will, when placed upon a smooth inclined board or surface having a suitable descent, operate as follows: To start the figure walking it is touched on its one side, so as to give it a slight lateral movement, which will cause it to rock on its feet toward the opposite side, thereby causing one foot to be lifted from the plane, as shown in Fig. 3, and to swing forward by gravity far enough down the inclined plane and with sufficient force by the pendulum action of the leg and the acquired momentum to carry it as far beyond the center of gravity in a lateral direction as the point of rest on the opposite side. This will cause the other foot to be lifted and it and its leg to swing forward and to laterally pass the center of gravity in like manner, and so on continuously, alternately either leg and foot, whereby the figure will be made to oscillate and move forward in a very lifelike manner until it reaches the base of the incline, which operation may be repeated indefinitely.

The toy may be constructed of metal, wood, or other material, or of a combination of different materials, and may be dressed, covered, or decorated in any desired way that will not give excessive weight to the upper portion of the figure or hinder the movement of the legs, as illustrated, for instance, in Fig. 1.

The toy or figure may be constructed with a bust, c, and trunk d, Figs. 2 and 3, of any suitable form and proportions, and the legs A A, made of wire or of other material, also shaped, if required, to imitate nature, and pivoted at the armpits or at any other suitable point into the body. The hip portion may be recessed on each side, as at e, Fig. 2, to limit the movement of the legs, and a wire, Figs. 2 and 3, passed through the shoulder portion of the body and extended and bent downward to form the arms f f.

Fig. 7 shows a simple skeleton construction of the figure, composed of two pieces of wire bent to form the shape of the figure and locked together at the shoulders, forming a kind of loop-hinge, coiled as at g g', the one wire forming one of the legs A, with attached foot B, and passing as a leg-pivot, b, through the one coil g, and bent to form a lower loop, d, corresponding to the trunk or body, then twisted to form the other coil, g', and extended and bent to represent the one arm f, while the other wire forms the other leg and foot, passes as a leg-pivot, b, through the coil g', then looped, as at h, corresponding to the head of the figure, next twisted to form the coil g, and then extended and bent to represent the other arm f. Said wires may be looped, as at i i, to indicate the hips and add to the symmetry of the figure, and to also add to the convenience of adjusting the length of the legs, while the portions which represent the arms may serve as a stop to limit the movement of the legs.

To apply the invention to quadrupeds it is only necessary to connect two pairs of walking members by a suitable bar corresponding to a spine, or, which is the same thing, pivoting four legs to the body of the animal with attached feet of substantially the shape hereinbefore described for the human figure. An illustration of this is shown in Fig. 8, the figure there represented being that of an elephant; but the invention is equally applicable to other quadrupeds as well as bipeds, the principle of action and requisite construction being the same in all cases.

By attaching a thread about or near the shoulders of any of these toys or figures they may be led on a level or up an inclined plane, and will step out or go through the same walking motion with their feet as when moving by themselves down an inclined surface.

Having thus fully described my invention, I claim as new and desire to secure by Letters Patent—

1. A walking toy or figure provided with opposite side legs pivoted to indendently swing as pendulum-rods, and having attached feet adapted to operate as pendulum balls or weights, and constructed on their bottom surfaces to form rockers, substantially as and for the purposes herein set forth.

2. In a walking toy, the pivoted opposite side legs of corresponding length and adapted to independently swing at their lower ends in parallel planes from or about an upper transverse axis common to both, in combination with attached feet transversely curved on their lower surfaces and unitedly forming a lateral rocker to the toy, essentially as shown and described.

3. In a walking toy, the independently-swinging pendulum-like legs A A on opposite sides of the figure or toy, in combination with the pendulum-weight-like feet B B, of convex construction on their lower surfaces from back to front, whereby the toy, when walking, is made to rock forward, essentially as specified.

4. In a walking toy, the independently-swinging pendulum-rod-like legs A A on opposite sides of the toy, in combination with the pendulum-weight-like feet B B, of transverse and longitudinal convex curvature on their lower surfaces, substantially as described, and for the purposes herein set forth.

5. In combination with the pivoted legs A A, the attached feet B, of convex curvature in direction of their width on their lower surfaces and with their outer side margins at a higher elevation and nearer to the axis of motion of the legs than their inner side margins, essentially as shown and described.

6. A walking toy having one or more pairs of upper pivoted opposite side legs with attached rocker-like feet adapted to provide for both the forward and lateral rocking of the toy on their ground or lower surfaces, and the legs being adapted to independently swing forward in parallel planes at or near the feet, substantially as described, and for the purposes herein set forth.

7. In a walking toy having independently-swinging opposite side legs and rocker-like feet, the toy or frame thereof, constructed of two independent pieces of wire bent, respectively, to form the feet B B, legs A A, coils g g', adapted to provide for the independent swinging of the legs, arms f f, and head and trunk in the form of loops h d, essentially as shown and described.

GEORGE T. FALLIS.

Witnesses:
 GEO. W. SAMUEL,
 J. M. WILSON.